United States Patent
Hu

(12) 
(10) Patent No.: US 6,283,286 B1
(45) Date of Patent: Sep. 4, 2001

(54) DVD/VCD/CD HOLDER

(75) Inventor: Wen-Long Hu, Taoyuan (TW)

(73) Assignee: Wah-De Electron Co., Ltd., Taoyuan (TW)

( * ) Notice: Subject to any disclaimer, the term of this patent is extended or adjusted under 35 U.S.C. 154(b) by 0 days.

(21) Appl. No.: 09/624,281

(22) Filed: Jul. 24, 2000

(51) Int. Cl.[7] .................................................. B65D 85/57
(52) U.S. Cl. ...................................... 206/310; 206/308.1
(58) Field of Search ................................ 206/307, 308.1, 206/309–312, 493, 232

(56) References Cited

U.S. PATENT DOCUMENTS

| | | | |
|---|---|---|---|
| 4,892,189 | * 1/1990 | Kunimune et al. | 206/309 |
| 5,158,176 | * 10/1992 | Wolf | 206/307 |
| 5,361,903 | * 11/1994 | Thiele | 206/310 |
| 5,775,494 | * 7/1998 | Taplin | 206/311 |
| 5,799,782 | * 9/1998 | Gelardi | 206/308.1 |
| 5,882,748 | * 3/1999 | Tomoda | 206/308.1 |

* cited by examiner

Primary Examiner—Luan K. Bui
(74) Attorney, Agent, or Firm—Alan Kamrath; Rider, Bennett, Egan & Arundel, LLP

(57) ABSTRACT

A holder for a DVD/VCD/CD has a cover and a base pivotally connected with the cover. Both the cover and the base have at least one through hole defined to correspond to each other and at a respective edge of the cover and the base. The aligned through holes in the cover and the base allow the user to assemble multiple holders together to facilitate carrying and storage. Furthermore, the holder has a retaining device provided on the center of the base to securely clamp the DVD/VCD/CD in the holder.

4 Claims, 5 Drawing Sheets

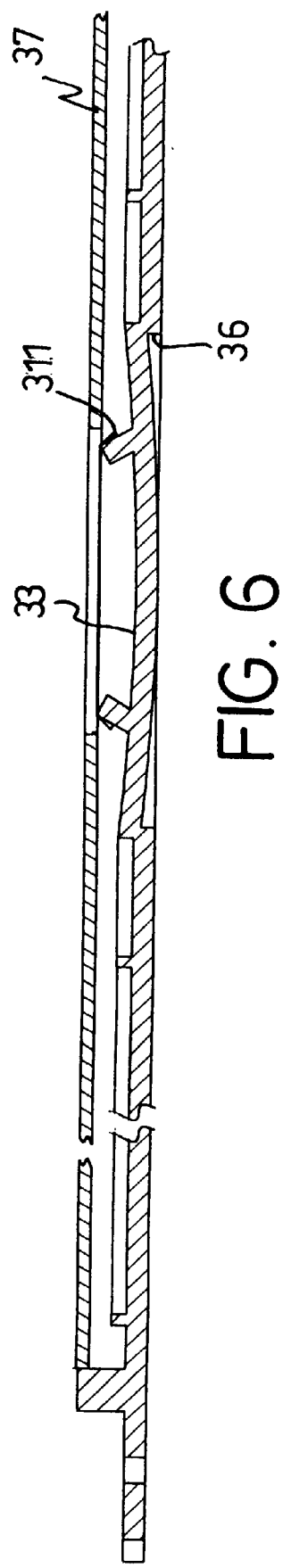
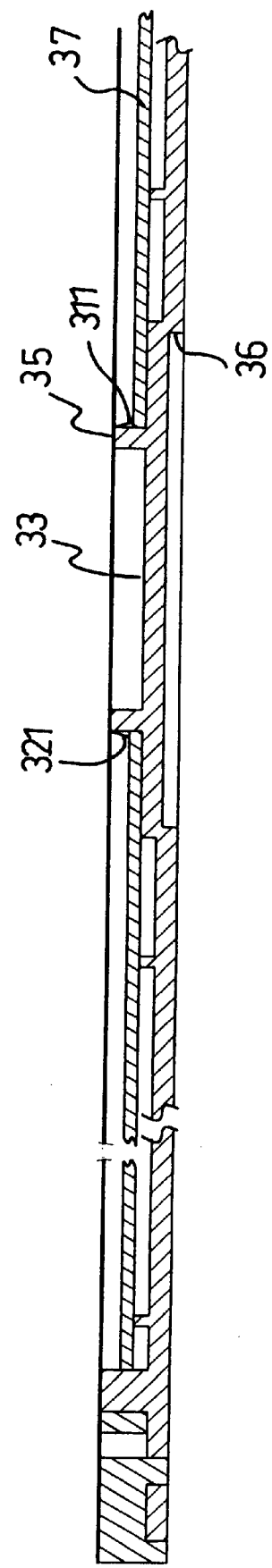

DVD/VCD/CD HOLDER

BACKGROUND OF THE INVENTION

1. Field of the Invention

The present invention relates to a holder, and more particularly to a holder for a DVD/VCD/CD. The DVD/VCD/CD holder has a paper-made cover and a base with the cover detachably located on the top. The base has a disk centrally protruding out and having at least two equally spaced pairs of slits, at least two L shaped retainers each formed between two adjacent slits and having a wedged boss on the outside face of the retainer. A press is centrally provided to connect with each of the retainers by means of a bridge, such that when the press is pressed, each of the retainers will be deformed to incline toward the press so as to release the clamped DVD/VCD/CD. Furthermore, at the joint between the cover and the base, multiple through holes are defined so that the user is able to assemble holders together by means of a thread or the like inserted through the aligned through holes of the holders.

2. Description of Related Art

A CD, DVD/VCD/CD, because of its fragility, usually is stored in a holder so as to protect it from any kind of impact. A conventional holder usually has a series of resilient plates arranged in the center of the bottom of the holder in a circle. Each of the series of resilient plates are L shaped in section and the diameter of the circle is slightly larger than that of the central through hole of the DVD/VCD/CD. When a DVD/VCD/CD or the like is to be held in the holder, the DVD/VCD/CD is pressed onto the resilient plates to deform the plates. The distal ends of the resilient plates, after being deformed, will have a smaller diameter than that of the central through hole of the DVD/VCD/CD and are then able to be inserted into the central through hole of the DVD/VCD/CD. After the distal ends of the resilient plates are inserted into the central through hole of the DVD/VCD/CD, the L-shaped distal ends of the resilient plates securely clamp the periphery defining the central through hole and the DVD/VCD/CD is firmly positioned on the bottom of the holder. However, because the holder needs to securely clamp the DVD/VCD/CD, a minimum thickness of the holder is necessary to provide a substantial holding to the DVD/VCD/CD, which makes the holder too thick to be carried conveniently. Furthermore, when multiple DVD/VCD/CD holders are stacked together, it is quite easy that the stacked DVD/VCD/CD holders become scattered when an unexpected force is employed.

To overcome the shortcomings, the present invention tends to provide an improved holder for a DVD/VCD/CD to mitigate and obviate the aforementioned problems.

SUMMARY OF THE INVENTION

The main objective of the invention is to provide an improved DVD/VCD/CD holder. The holder has a paper-made cover and a base with the cover detachably located on the top of the base. The base has a disk centrally protruding out and having at least two equally spaced pairs of slits, at least two L shaped retainers each formed between two adjacent slits and having a wedged boss on the outside face of the retainer. A press is centrally provided to connect with each of the retainers by means of a bridge, such that when the press is pressed, each of the retainers will be deformed to incline toward the press so as to release the clamped DVD/VCD/CD.

Another objective of the invention is to provide an improved DVD/VCD/CD holder having multiple through holes defined in the joint between the cover and the base so that the user is able to assemble holders together by means of a thread or the like inserted through the aligned through holes of the holders.

Other objects, advantages and novel features of the invention will become more apparent from the following detailed description when taken in conjunction with the accompanying drawings.

BRIEF DESCRIPTION OF THE DRAWINGS

FIG. 5 is a side plan view in section of the holder of FIG. 1 with a DVD/VCD/CD clamped thereon; and FIG. 6 is a sectional plan view of the holder of FIG. 1 with the press being pressed to deform the L-shaped retainers to release the limitation to the DVD/VCD/CD.

DETAILED DESCRIPTION OF PREFERRED EMBODIMENT

Figure 1:
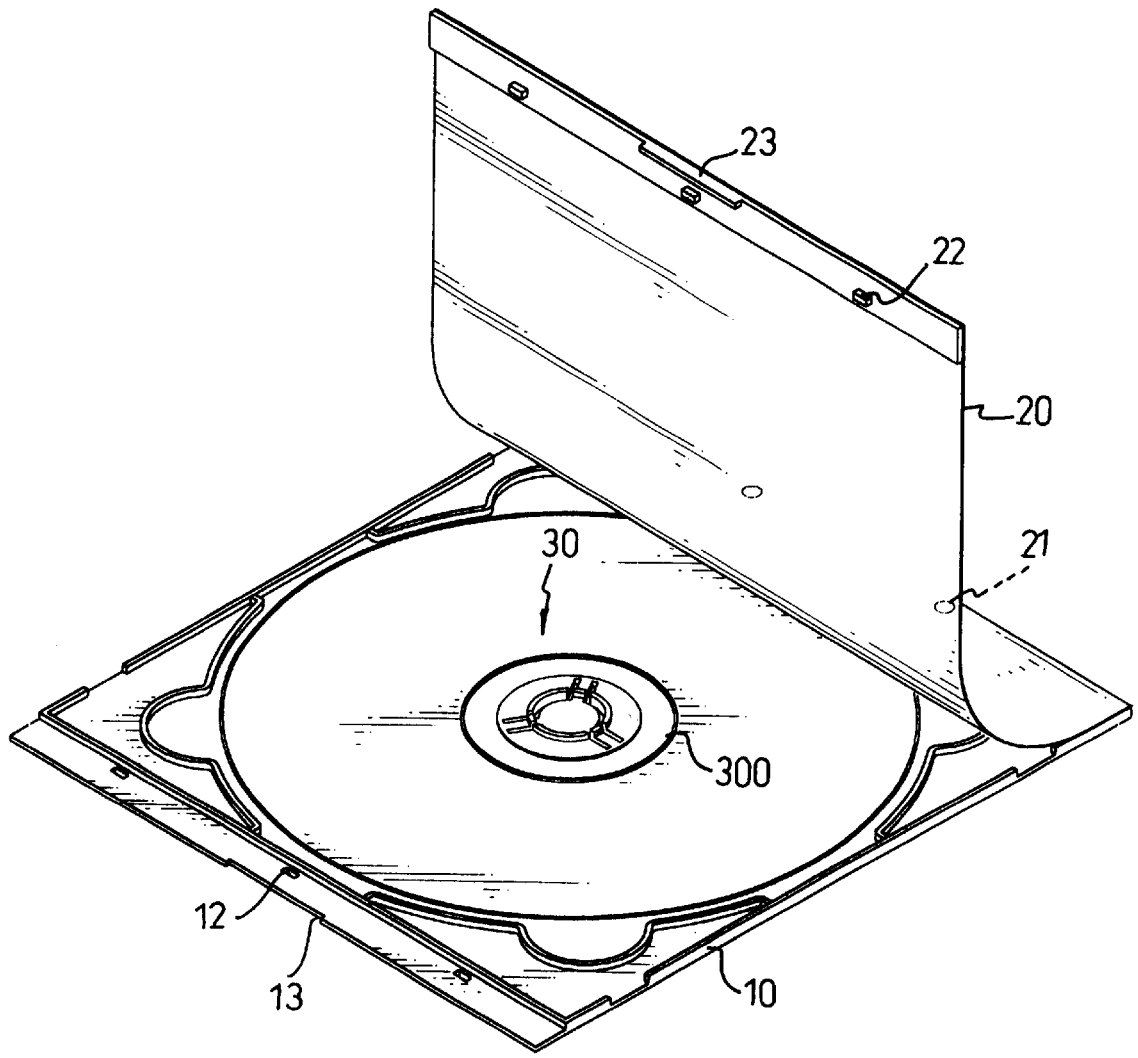
FIG. 1 is a perspective view showing the holder in accordance with the present invention, wherein the cover is lifted to show the structure of the base.
Figure 2:
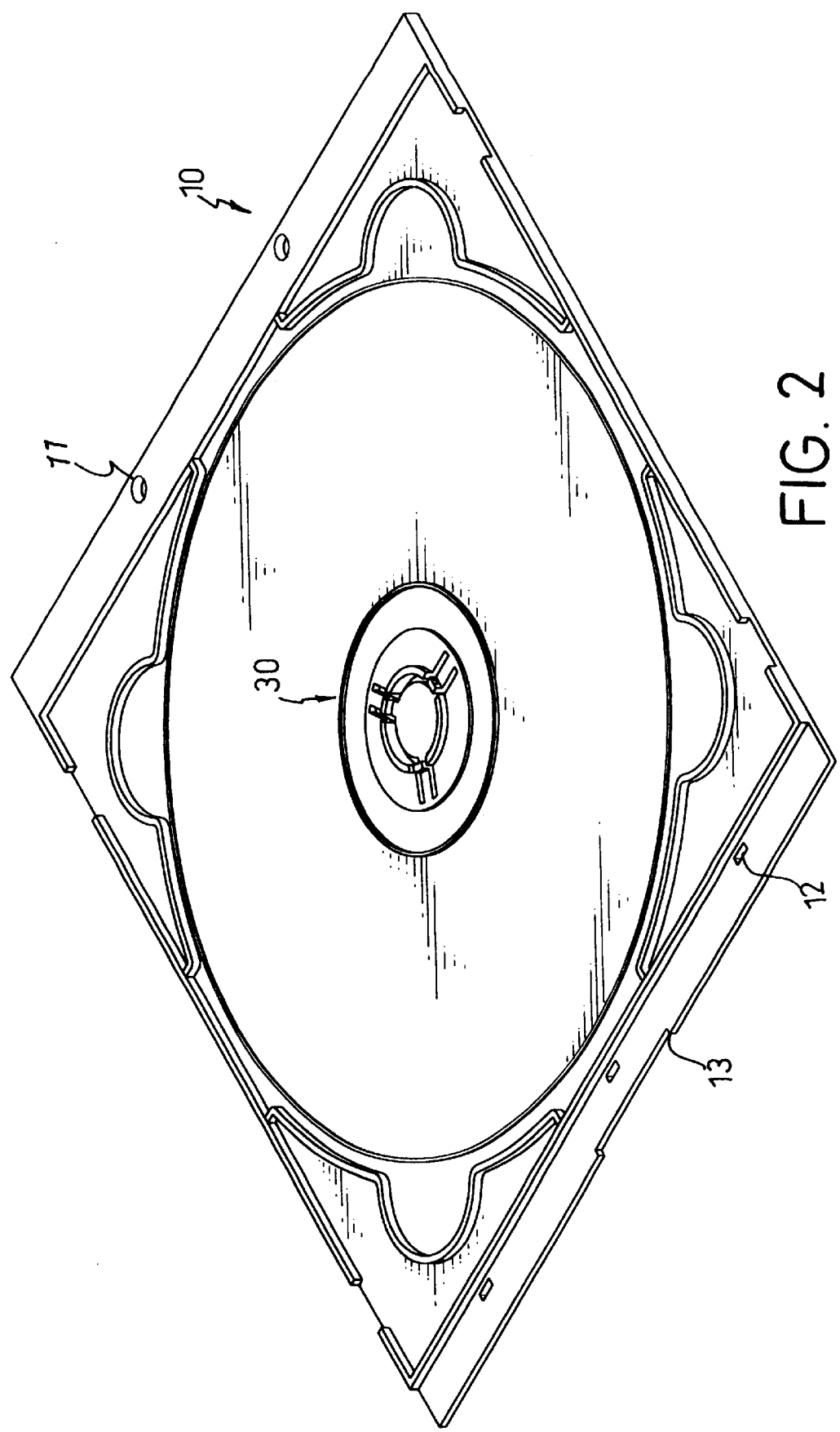
FIG. 2 is a perspective view of the base with the cover removed.
Figure 3:
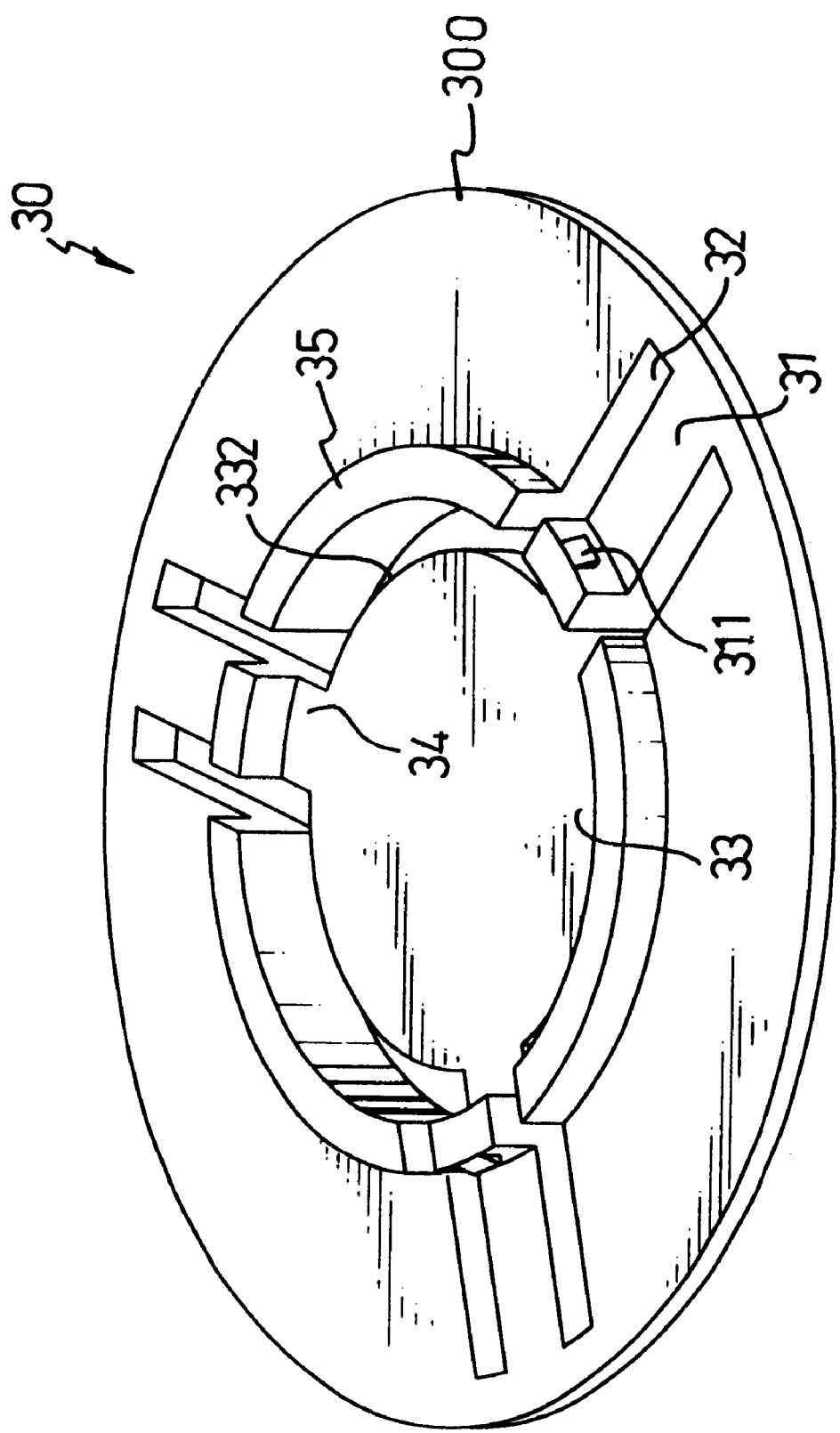
FIG. 3 is a partially enlarged perspective view showing the structure of the disk centrally protruding out from the base.

With reference to FIGS. 1, 2 and 3, a DVD/VCD/CD holder has a base (10) and a cover (20) pivotally connected to the base (10). The cover (20) is made of paper or the like, such that the thickness of the cover (20) is able to be maintained thin. The cover (20) has at least one first through hole (21) defined at the joint with the base (10), at least two bosses (22) formed on an edge thereof and a tongue (23) extending out from the edge.

Figure 4:
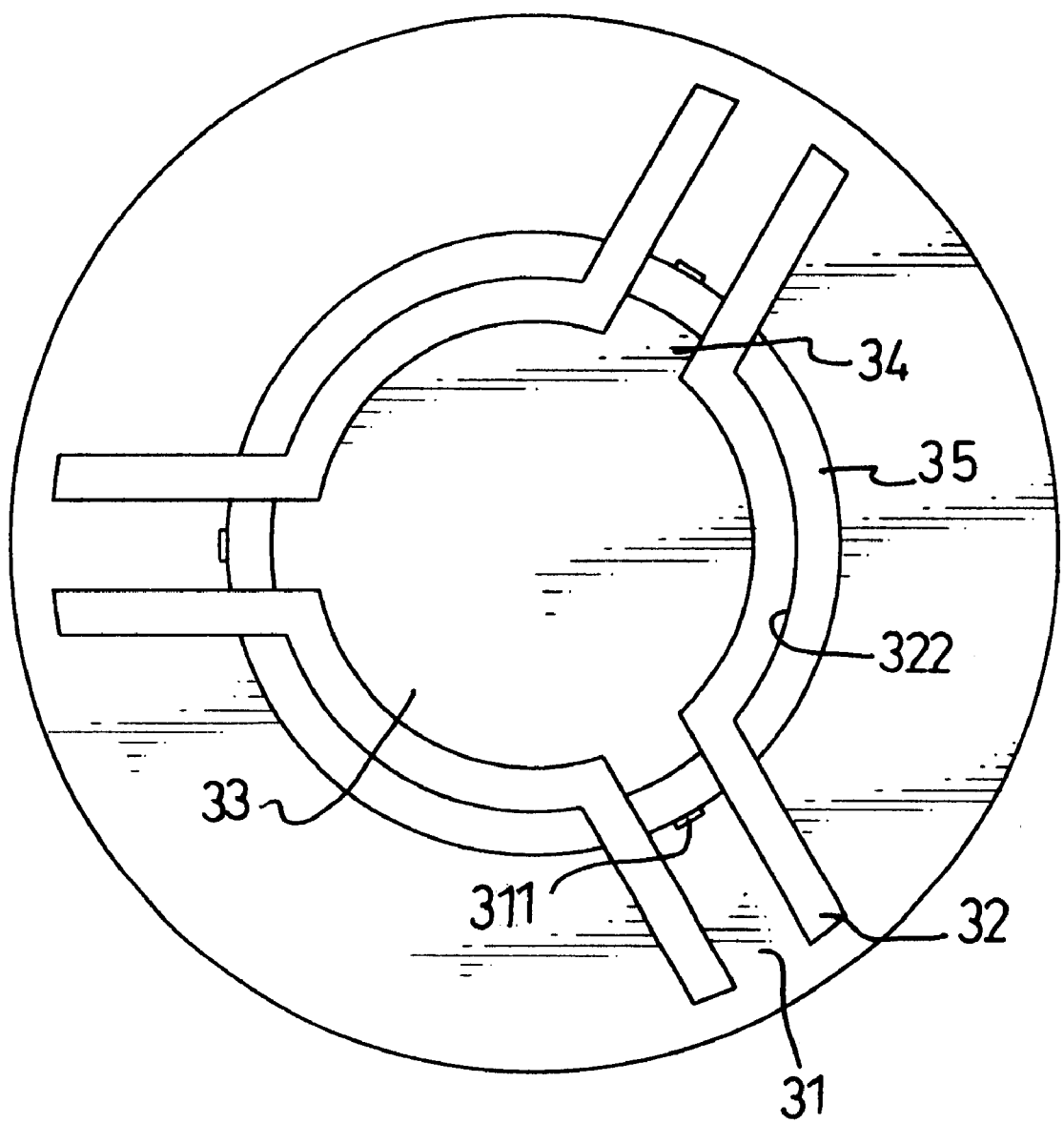
FIG. 4 is a top plan view of the structure of the disk.

The base (10) has at least one second through hole (11) defined at the joint with the cover (10) to correspond to the first through hole (21) of the cover (20), at least two recesses (12) defined to receive therein the at least two bosses (22), a cutout (13) corresponding to the tongue (23) of the cover (20) and a retaining device (30) formed for securely clamping a DVD/VCD/CD. Referring to FIG. 3, it is noted that the retaining device (30) has a disk (300) centrally protruding out from a face of the base (10), at least two L-shaped retainers (31), at least two pairs of equally spaced slits (32) each having the L-shaped retainer (31) formed therebetween, at least two arcuate trenches (332) each defined to communicate with one of the at least two pairs of slits (32), a press (33) formed in the center of the disk (300) and connected with each of the retainers (31) by means of a bridge (34) and at least two arcuate walls (35) formed on the disk (300) between two adjacent slits (32) of different pairs thereby the arcuate walls (35) together with the L-shaped retainers (31) forming a circular projection having an outer diameter the same as that of the central hole (not shown) of the DVD/VCD/CD. When taking FIG. 4 for reference and referring back to FIG. 3, it is noted that the press (33) connects with the disk (300) only by means of the bridges (34) each integrally formed with one of the L-shaped retainers (31) and because of the pair of slits (32) along the opposed sides of the retainer (31), the movement of the press (33) will drive the L-shaped retainers (31) to move in the same direction.

Furthermore, each of the L-shaped retainers (31) has a wedge (311) formed on a side face opposed to that facing the press (33), which slightly enlarges the diameter of the circular projection.

With reference to FIGS. 5 and 6, when the DVD/VCD/CD (37) is to be clamped by the holder of the invention, the user just puts the DVD/VCD/CD (37) on top of the disk (300) with its central hole aligned with the circular projection. As described, the arcuate walls (35) together with the L-shaped retainers (31) are able to extend through the central hole of the DVD/VCD/CD (37). After extending through the central hole of the DVD/VCD/CD (37), due to the elasticity of the material used to make the wedges (311), the wedges (311) can also extend through the central hole of the DVD/VCD/CD (37) and then securely clamp the DVD/VCD/CD (37).

When the user wants to remove the DVD/VCD/CD (37) from the holder of the invention, the user presses the press (33) to simultaneously deform the L-shaped retainers (31), which allows the wedges (311) to incline toward the center of the press (33). Therefore, the diameter of the circular projection is reduced and thus the DVD/VCD/CD (37) is able to be moved away from the limit of the holder. To increase the deformation effect of the L-shaped retainers (31), a recess (36) is defined in a bottom face of the base (10) to correspond to the press (33), such that a space is provided to the press (33) for a greater downward movement and accordingly a greater deformation to the L-shaped retainers (31). After the wedges (311) escape from the central hole of the DVD/VCD/CD (37) and the pressing force applied to the press (33) is released, the diameter of the circular projection with the wedges (311) resume to its original dimension, which is slightly larger than that of the central hole of the DVD/VCD/CD (37), so as that the DVD/VCD/CD (37) will be pushed upward and supported by the arcuate walls (35). Thereafter, the user is able to pick up the DVD/VCD/CD (37) easily.

When the DVD/VCD/CD (37) is received in the holder of the invention, the user is able to use a thread of the like to assemble multiple holders together by inserting through the aligned at least one first through hole (21) of the cover (20) and the at least one second through hole (11) of the base (10), which facilitates the carrying and storage by the user.

It is concluded that the DVD/VCD/CD holder of the invention has the following advantages:

1. Because the at least two L-shaped retainers (31) are lowered simultaneously with the press (33), the DVD/VCD/CD (37) originally secured by the wedges (311) can be evenly and smoothly released.

2. The multiple intermittently formed arcuate walls (35) allow the user to facilitate the holding of the DVD/VCD/CD.

3. The centrally protruding disk (300) engages with the side face adjacent the central hole of the DVD/VCD/CD (37) to protect it from scratching and damage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A DVD/VCD/CD holder comprising:

a cover having at least one first through hole, at least two bosses formed on an edge thereof and a tongue;

a base pivotally connected with the cover and having at least one second through hole defined at the joint with the cover to correspond to the at least one first through hole of the cover, at least two recesses defined to receive therein the at least two bosses, a cutout corresponding to the tongue of the cover and a retaining device formed for securely clamping a DVD/VCD/CD; and wherein the retaining device has a disk centrally protruding out from a face of the base, at least two L-shaped retainers, at least two pairs of equally spaced slits each having the L-shaped retainer formed therebetween, at least two arcuate trenches each defined to communicate with one slit of the at least two pairs of slits, a press formed in the center of the disk and connected with each of the L-shaped retainers by means of a bridge and at least two arcuate walls formed on the disk between two adjacent slits of different pairs thereby the arcuate walls together with the L-shaped retainers forming a circular having an outer diameter the same as that of the central hole of the DVD/VCD/CD.

2. The DVD/VCD/CD holder as claimed in claim 1, wherein the cover is made of paper.

3. The DVD/VCD/CD holder as claimed in claim 2, wherein a recess is defined in a bottom face of the base to oppositely correspond to the press to provide a space for allowing the movement of the press.

4. The DVD/VCD/CD holder as claimed in claim 1, wherein a recess is defined in a bottom face of the base to oppositely correspond to the press to provide a space for allowing the movement of the press.

* * * * *